June 8, 1965 P. D. LABOMBARDE Re. 25,792

APPARATUS AND METHOD FOR GLOSSY WAX COATING

Original Filed Dec. 28, 1959 3 Sheets-Sheet 1

INVENTOR.
PHILIP D. LABOMBARDE
BY
Pearson + Pearson
ATTORNEYS

APPARATUS AND METHOD FOR GLOSSY WAX COATING
Original Filed Dec. 28, 1959 3 Sheets-Sheet 2
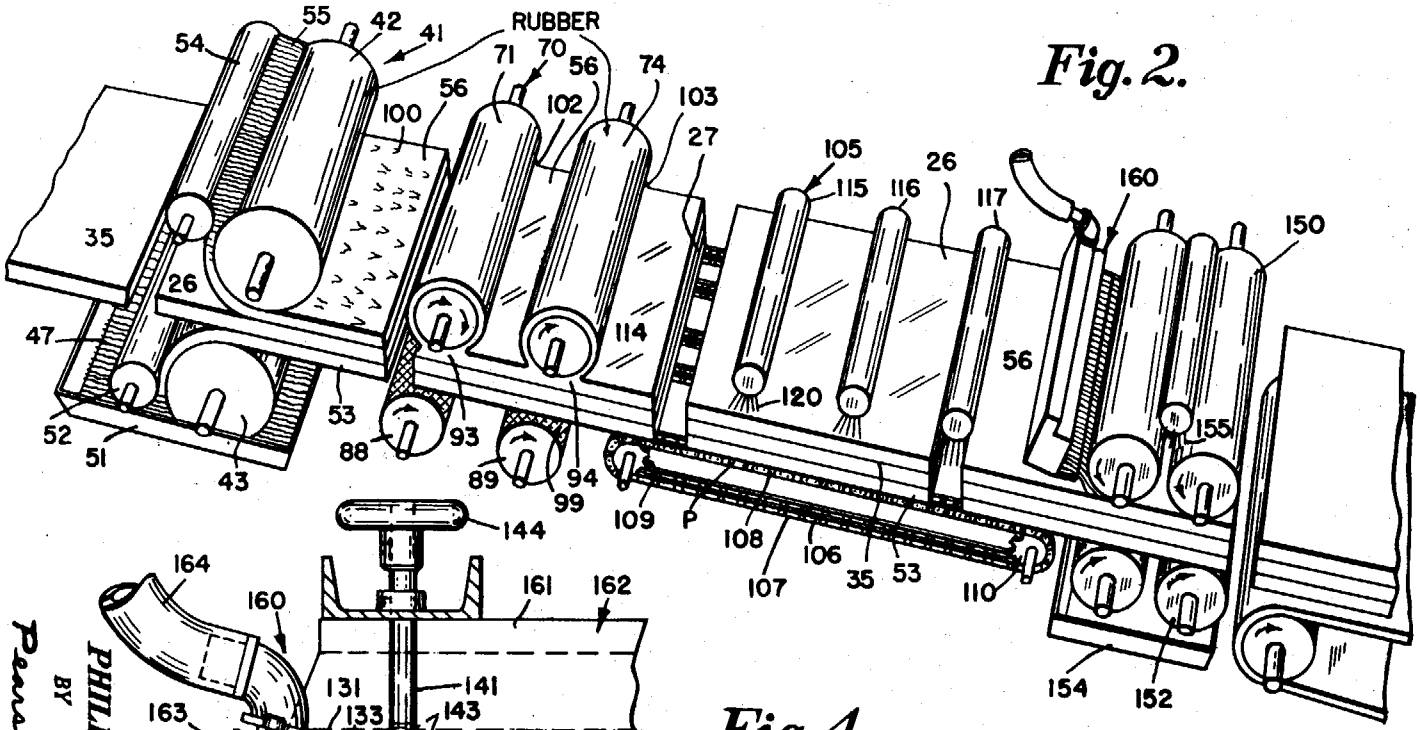
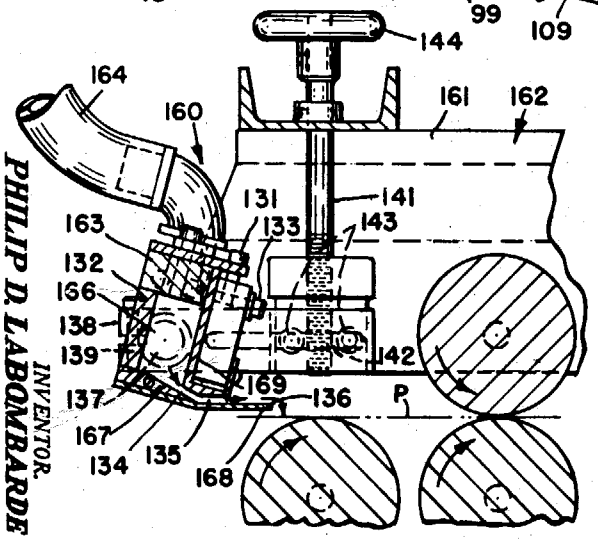
INVENTOR.
PHILIP D. LABOMBARDE
BY
Pearson + Pearson
ATTORNEYS

APPARATUS AND METHOD FOR GLOSSY WAX COATING

Original Filed Dec. 28, 1959 3 Sheets-Sheet 3

INVENTOR.
PHILIP D. LABOMBARDE
BY
Pearson + Pearson
ATTORNEYS

United States Patent Office

Re. 25,792
Reissued June 8, 1965

25,792
APPARATUS AND METHOD FOR GLOSSY WAX COATING

Philip D. Labombarde, 12 Lake St., Nashua, N.H.

Original No. 3,070,457, dated Dec. 25, 1962, Ser. No. 862,192, Dec. 28, 1959. Application for reissue May 15, 1963, Ser. No. 280,760
14 Claims. (Cl. 117—46)

Matter enclosed in heavy brackets [ ] appears in the original patent but forms no part of this reissue specification; matter printed in italics indicates the additions made by reissue.

This invention relates to an apparatus and method for producing a high gloss, mirror-like finish on waxed cartons of paperboard or the like.

It is well known that continuous webs of paperboard may be coated by passage through a bath of hot melt coating composition such as paraffin wax, or by passage through the nip of opposed coating rolls, and that the wax coating on the web can be hardened by passage through a bath of coolant liquid or by passage through the nip of opposed chilling rolls. Individual flat cartons of paperboard having also been wax coated by being carried on an endless conveyor, or on conveyor rolls, through a coating zone and then through a quenching zone.

With the advent of the purchase of goods by visual impact while displayed on the counters and shelves of self-service establishments, there has been an increased demand not only for wax coated containers but for a high gloss finish thereon. It has heretofore been proposed to secure a glossy finish by subjecting a waxed web to the action of directly, or reversely, rotating hot finish rolls after the saturation step and before the chilling or quenching step as in U.S. Patent 395,645 to Anderson of January 1, 1889, and U.S. Patent 1,429,928 to Carter of September 26, 1922. The demands of the trade are such that ordinary paraffin wax coatings are being supplanted by hot melt coating compositions which include microcrystalline wax, polyetheylene and the like, to better seal and insulate the cartons, make the fold lines more pliable and leakproof, resist the action of grease and avoid tackiness in the coating and produce an improved feel.

In this invention the hot melt coating composition includes at least 10 percent of polyethylene and may range from 10 percent to forty percent of polyethylene with the remainder formed of paraffin wax. The presence of the polyethylene adds to the desirable characteristics of the coating but makes the securing of a high gloss surface much more difficult and costly. In this invention also, the hot melt coating composition is applied by coating rolls, to secure a thin film and to make possible pattern, or spot, coating and the roll coating of polyethylene compositions also presents difficulties which must be overcome.

The roll application of a hot melt coating composition including polyethylene, results in the stripping of particles by the coating rolls themselves, thereby forming pock marks or crow's foot marks in the coated surface and the coating rolls, or any hot finish rolls, tend to form minute scratches or ridges in the surface, such markings not being commercially acceptable.

The passing of the articles to be coated through a bath of coating composition or coating by other than roll means, tends to eliminate the formation of pock marks and scratches in the coating but causes the articles to be unduly impregnated and saturated, thereby using excessive amounts of the coating composition and increasing cost unnecessarily.

It is the object of this invention to produce a true high gloss finish on wax coated cartons with a minimum of coating composition and a maximum smoothness and lustre of surface;

Another object of the invention is to provide an apparatus and method for high gloss finishing articles coated with a hot melt wax composition, wherein the crow's-foot marks, scratches and ridges of roll coating are all eliminated prior to final hardening of the coating.

A further object of the invention is to provide apparatus for roll coating a relatively thin film of hot melt coating composition onto a box blank without substantial impregnation, for reverse roll removing and redepositing the top portion of the film to eliminate crow's-foot marks, for remelting the top portion of the film, to eliminate all remaining marks and for hardening the resulting finish without causing further marks thereon.

Still another object of the invention is to provide apparatus for metering a thin wax coating onto cool blanks for immediate hardening, for removing and reverse roll removing and redepositing a thin layer at the top of the hardened coating, for liquefying the said thin layer into a pool to create a mirror-like, level surface and for progressively and uniformly showering the layer with a waterfall of coolant liquid to harden the same without marking the coating.

Other objects and advantages of the invention will be apparent from the claims, the description of the drawings and from the drawings in which:

FIG. 2 is an enlarged, diagrammatic side view showing the steps in the method of the invention.

FIG. 4 is an enlarged side elevation of the quenching apparatus of the invention.

Figure 1:
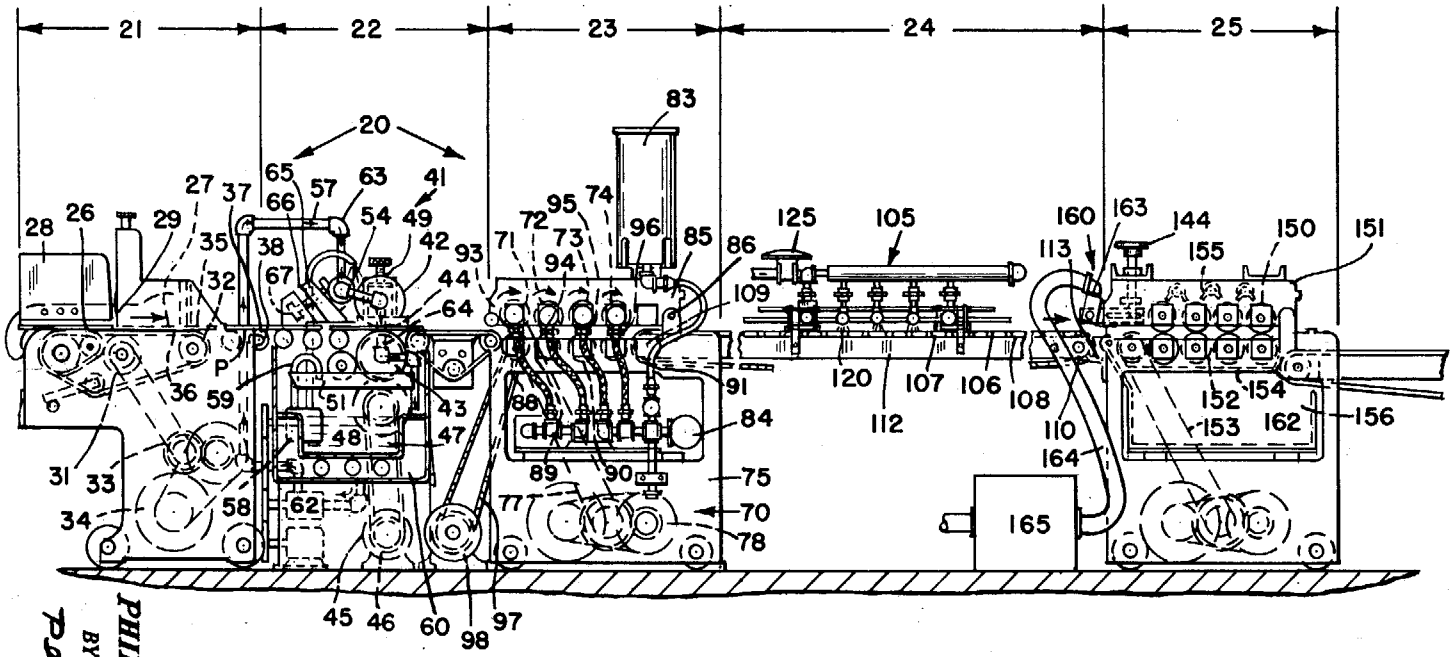
FIG. 1 is a side elevation of a machine constructed in accordance with the invention.

As shown in the drawings, the machine 20 of this invention includes a feeding zone 21, a roll coating zone 22, a smoothing zone 23, a levelling zone 24 and a quenching zone 25.

In the feeding zone 21, box blank magazine means is provided for feeding box blanks such as 26 and 27 individually and successively from one end of a stack of identical blanks contained in the magazine 28. Each successive blank is advanced through a blank gateway 29 and along the horizontal paper line P into the coating zone 22 by a friction feed wheel 31 and conveyor 32, the latter being driven by a suitable power train 33 from an electric motor 34. Any suitable feeding apparatus can be used in this invention and for convenience, the machine illustrated is a well known type, now in use in the trade. It should be noted that the blanks 26 and 27 are flat and that they are cool, at room temperature, when delivered into the coating zone 22. The blanks 26 and 27 are usually of relatively thin paperboard and suitable for containing frozen foods when the carton is erected, although they may be of any well known type requiring a hot melt coating for food preservation purposes or otherwise.

COATING

Unlike the prior art wherein the box blanks are immersed in hot liquid wax, or other coating composition, in the coating zone such as 22, it is an essential element of this invention that the coating composition be applied in as thin a layer as possible on the top and bottom faces of the blanks with the coating hardening instantaneously when it strikes the cool blanks. Practically no impregnation into the material of the blank takes place, such impregnation being especially undesirable. This is for the reason that boxboard has a surface which appears smooth but actually has a fibrous texture and if the coating sinks entirely into the boxboard the surface remains fibrous and impossible to bring to a high gloss smoothness unless re-coated. On the other hand, the rapid hardening of the thin layer, or film, of coating composition in this invention envelops and covers the fibrous surface while lying on the upper face 35 of the boxboard and presents a coated surface that can be given a lustre. The bottom, or underface 36, of each blank will be the inside of the resulting box whereby it merely thinly coated with no attempt to gloss the same.

Figure 3:
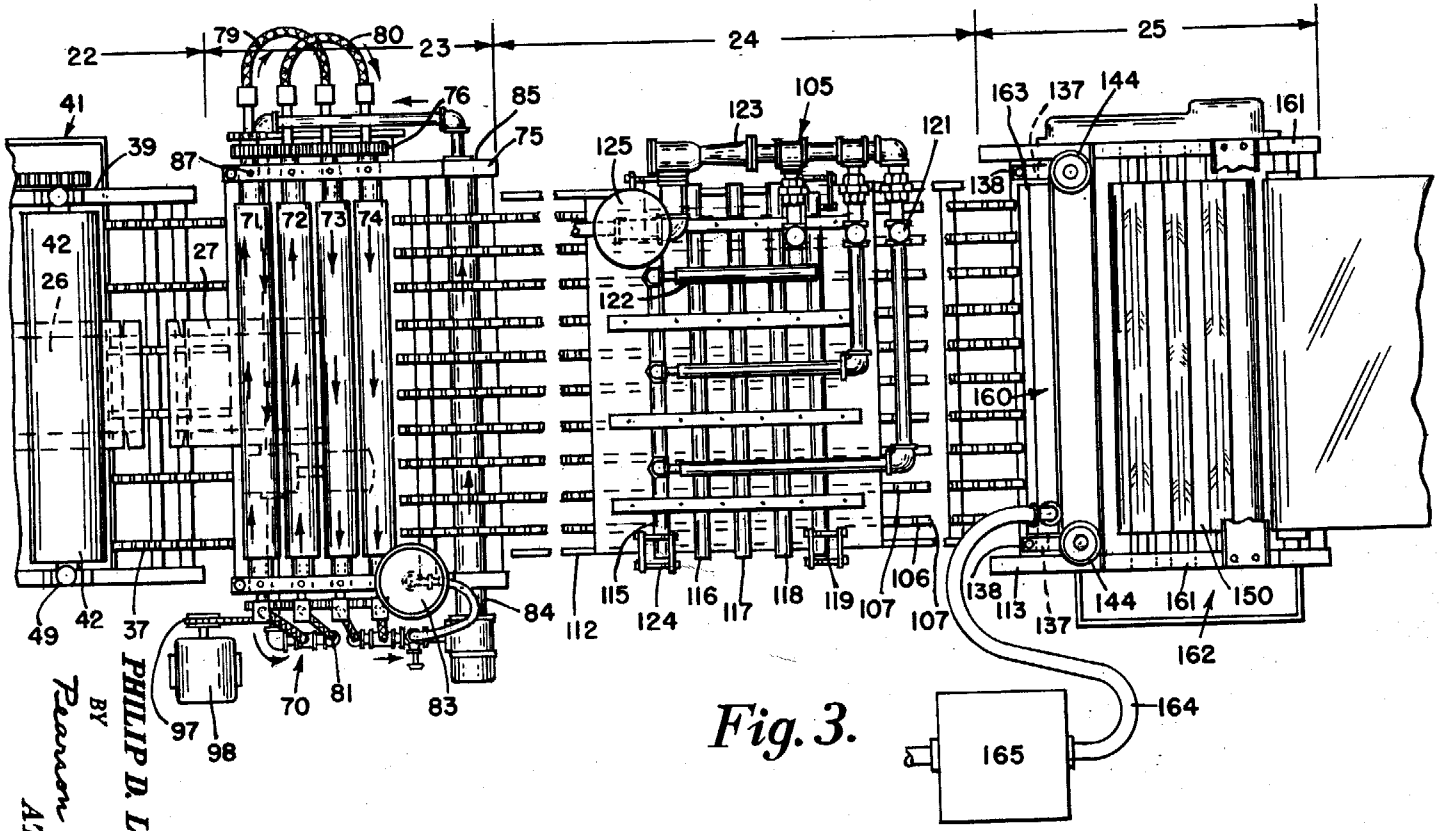
FIG. 3 is a fragmentary plan view of the apparatus shown in FIG. 1 on a slightly enlarged scale.

In the coating zone 22 each blank 26 or 27 is advanced along the paper line P on blank carrier means 37 in the form of a plurality of conveyor rolls 38 journalled at each opposite end in the frame 39 of the coating apparatus 41. As best shown in the diagram of FIG. 3, the coating apparatus 41 includes an upper applicator roll 42 and an opposed lower applicator roll 43, forming a nip 44, both rolls being suitably journalled in frame 39 and interconnected by gears to revolve in the direction of advance of the blanks. The lower roll 43 is rotated through a power train 45 by a motor 46 and the hot melt coating composition 47 is supplied from a reservoir tank 48 through a suitable pump. Both applicator rolls are smooth and cylindrical, but roll 43 is of steel while roll 42 is of rubber. Pressure adjustment mechanism 49 is provided for the applicator rolls whereby the pressure at the nip 44 is just sufficient to advance the blanks without squeezing off the coating. Roll 43 revolves in a pan 51 containing hot liquid wax composition, the thin wax film adhering thereto being metered by a doctor roll 52 of rubber and then transferred in a film 53 of predetermined thickness to the underface 36 of the cool blanks such as 26 and 27. Roll 42 is provided with a doctor roll 54 of steel, forming a nip type reservoir 55 whereby a thin wax film 56, having a thickness controlled by the spacing of roll 54, adheres thereto and is transferred to the cool upper face 35 of the blanks such as 26 and 27. The doctor roll 54 is preferably heated at a temperature of about 140° F. and the applicator roll 43 is also heated to a temperature of about 140° F. by any convenient and well known means such as a hot oil circulating system designated generally as 57. Each blank passing through nip 44 is thus coated with a thin film of the hot melt coating composition 47 on both the upper and lower faces, the film being of controlled, predetermined thickness and hardening almost instantaneously. The hot melt coating composition preferred for use in the apparatus and method of this invention contains at least ten parts of polyethylene and 90 parts of paraffin wax by volume, but up to 40 parts polyethylene may be used, depending on the characteristics desired in the finished cartons.

The hot melt coating composition in reservoir tank 48 is pumped by the pump 58 and tubes such as 59 into the pan 51 and nip type reservoir 55 and the composition is heated by the usual immersion heaters in the jacket 60 surrounding reservoir tank 48. Another pump 62 feeds hot oil from jacket 60 through tubes 63 and 64 to the steel applicator roll 43 and the steel doctor roll 54 for maintaining the coating composition at the desired temperature of application.

Gauging means 65 is essential for controlling the distance between each doctor roll and its applicator roll and thereby controlling the thickness of the film of coating composition applied to the blanks. As shown, means 65 includes a movable mounting 66 for the bearings of doctor roll 54 and knurled turn screws such as 67 for moving the same toward and away from the applicator roll 42. The melting temperature of the hot melt coating composition will vary with the composition but is generally about 140° F. and the reservoir tank 48, pan 51, nip 55 and rolls 54 and 43 are maintained at about ten degrees more than the said melting point to keep the composition flowing freely.

SMOOTHING

The presence of the polyethylene in the coating composition is believed to cause the wax coatings 53 and 56 to harden with what I call "crow's-foot" marks in the surface thereof when application or treatment of the wax is by roll means and the rolls tend to leave a multiplicity of scratches or ridges in the surface. Thus while there is some gloss in the finish, at the end of the coating zone, the boxboard still diffuses and diffracts light irregularly rather than reflecting uniformly like a mirror or pool of liquid. In the smoothing zone the "crow's-foot" or "pock" marks in the finish are filled in or smoothed out by the pile-up of wax occurring at the nips of a plurality of reverse coating rolls so that the only irregularities remaining are the scratches or ridges probably caused by polyethylene particles caught in the nip of the reverse coating rolls. The smoothing apparatus 70 in the smoothing zone 23 includes a plurality of cylindrical, smooth faced rolls 71, 72, 73 and 74, journalled for rotation in the frame 75 and arranged to rotate in the same angular direction by the gear train 76 (FIG. 3). The finishing rolls 71, 72, 73 and 74 are reverse coating rolls, the gear train 76 being driven by the chain 77 and motor 78 in such a direction that the blank engaging portions of the rolls travel in a direction opposite to the direction of advance of the blanks. The rolls 71, 72, and 73 are of steel, smooth faced and hollow while the roll 74 is preferably smooth, hollow and faced with rubber to accommodate any irregularities in the blanks such as cut-outs, warps or folds. The rolls 71, 72, 73 and 74 are supplied with hot oil, at a temperature slightly above the melting temperature of the coating composition by means of the tubes such as 79, 80 and 81 leading from a hot oil tank 83 kept heated by the heater 84. As best shown in FIG. 3 the hot oil is circulated in the direction of the arrows to maintain uniformity of temperature and when the melting point of the composition is about 140° F. the rolls are at about 150° to 170° F.

Unlike the prior art where heated rolls are provided for finishing or burnishing and intended to frictionally engage and polish a hardened wax coating, the finishing rolls 71, 72, 73 and 74 of this invention are hot enough to actually melt a thin layer of the top of the coating, reverse roll remove the layer and reverse roll redeposit the layer on the coating. The blanks are advancing at about two hundred feet a minute through the machine and the contact is not sufficient to melt the lower portion of the coating to thereby sink into the boxboard. The entire bank of upper rolls 71, 72, 73 and 74 are mounted on a unitary frame or cover 85, pivoted at 86 and having pressure adjustment means 87 as in my copending application, Serial No. 788,385, filed January 22, 1959, now abandoned, whereby the frame and the rolls may be moved toward and away from the paper line P.

Opposite each hot roll 71, 72, 73 and 74 are rotating blank conveyor rolls 88, 89, 90 and 91 forming pressure nips 93, 94, 95 and 96 therewith at the paper line P. The lower rolls 88, 89, 90 and 91 are connected by a suitable gear train to all revolve in the same angular direction and they are driven by a chain 97 and motor 98 so that the blank engaging portion of the rolls advances in the same direction as the blanks. The surface of each lower roll is ridged or knurled as at 99 and because the lower face of each blank is cool with the coating 53 hardened, the knurled rolls advance the blanks while the reversely rotating rolls 71, 72, 73 and 74 slip in the melted upper portion of the upper coating 56. As best shown in FIG. 2 diagrammatically the crow's-foot marks 100 in the upper coating 56 are filled in or smoothed out by the reverse coating rolls 71, 72, 73 and 74, each roll removing and redepositing a thin layer on the coating by the piling up occurring at 102 and 103 in rear of the nips such as 93, 94. The blank conveyor rolls 88, 89, 90 and 91 deliver the smoothed blanks such as 26 and 27 into the levelling zone 24 with all marks erased from the upper coating 56 except for any marks produced by the reverse coating rolls 71, 72, 73 and 74 because of the presence of polyethylene in the composition.

LEVELLING

The levelling apparatus 105 in the levelling zone 24 preferably is associated with an elongated blank conveyor 106 which is horizontal in order to permit the reliquified coating composition to flow into a level, pool-like surface. The conveyor 106 comprises an endless chain 107 having an upper stretch 108 extending along the paper line P and trained around sprockets 109 and 110. For convenience the sprocket 109 is driven by connection with the drive of the smoothing apparatus 70 and the frame 112 of the conveyor 106 is supported by the smoothing apparatus 70 at one end and by brackets 113 on the cooling apparatus at the other end. While broken away in FIGS. 1 and 3 there is preferably a substantial distance such as three or four feet between the smoothing apparatus 70 and the levelling apparatus 105 to permit the blanks to air dry and harden before levelling.

The leveling apparatus 105 comprises a plurality of convection type heaters capable of heating the upper layer such as 114 of the upper coating 56 of each successive blank 26 or 27 passing thereunder at two hundred feet a minute to a temperature above the melting point of the composition. It should be noted that the box blanks 26 are usually printed and that a radiation type heater such as radiant plates heated electrically, infra red bulbs or the like would result in the darker printed portions absorbing heat more rapidly than the unprinted portions and therefore would fail to give uniform remelting. Preferably the convection type heaters of this invention are a plurality of transversely extending gas burners 115, 116, 117, 118 and 119, each directing a plurality of gas flames such as 120 directly onto the rapidly moving blanks passing therebelow. Suitable valves 121, supply pipes 122, manifolds 123, frame pieces 124 and a zero pressure regulator 125 is provided to support and control the gas burners 115, 116, 117, 118 and 119. The temperature at the gas burners is about 400° to 600° F. when the blanks are advancing at about two hundred feet a minute thereunder.

Upon passing through the levelling zone 24, the upper layer 114 of the coating 56 of each blank is progressively melted to a liquid, flowing state which levels any ridges or scratches into the mirror-like, pool-like, high gloss finish desired. The rapid passage of the blanks through the zone, and the fact that the lower coating 53, the main body of the blank and the lower portion of the upper coating 56 are cool and remain cool prevents any impregnation into the blank.

QUENCHING

To freeze, or set, the smoothed levelled high gloss finish on each blank 26 the conveyor 106 delivers the blanks into quenching apparatus 160 in the quenching zone 25 of the machine. It has been found that passing the blanks into the nips of chilled, and/or coolant showered rolls may produce markings on the high gloss finish especially when polyethylene is used in the coating composition. The quenching apparatus 160 of this invention includes no pressure nip and no spattering or splashing of coolant liquid but rather comprises a full width unbroken water fall of coolant liquid wherein the liquid falls only an extremely short distance under gravity, for example one half inch.

The lower coating 53 on the blanks 26 and 27 is hardened soon after leaving the coating apparatus 41 and therefore needs no quenching. The quenching apparatus 160 is therefore mounted above the paper line P, and above the path of the advancing blanks by means of the frame pieces 161 which may be supported on the frame of the cooling apparatus 162. Apparatus 160 comprises a housing 163 extending the full width of the machine 20 and fed with a cooling liquid such as water through a supply pipe 164 from any convenient source such as the refrigerated reservoir 165 of the cooling apparatus 162. The unbroken sheet of liquid, found desirable, is not obtainable from the usual showers of crossed sprays or from a full width, narrow slot mainly because the impact of liquid from such sources will cause an indentation in the still viscous, tacky coating 56 which is imperceptible but reduces the gloss. The housing 163 therefore includes a chamber 166 having an inclined bottom 167 terminating in a shelf 168 and a front wall 169 in the form of a movable sluice gate. The wall or gate 169 is vertically movable in ways by means of the turn screws 131 and may be moved toward the rear wall 132 by the turn screws 133. The bottom of gate 169 is angular to conform to the angle of the bottom 167 and shelf 168 and the coolant liquid travels down the inclined passage 134 along the horizontal passage 135 then along the shell 168 to fall off the terminal end 136 of the shelf in an unbroken sheet of liquid. Housing 163 includes stub shafts such as 137 at each opposite end angularly movable in the split clamps such as 138 the latter being tightenable by bolts 139 to position the shelf 168 parallel to the paper line P. The clamps 138 are supported on the thread rods 141 by means of slots 142 and set screws 143 for longitudinal movement relative to the paper line P and the rods 141 are vertically adjustable in the frame pieces 161 by the turn knobs 144. The gentle liquid fall of the quenching apparatus 160, with the liquid cooled to well below room temperature from 40° F. to 60° F. quenches the high gloss finish and sets the coating 56 without leaving any marks on the coating.

Thereafter the blanks 26 and 27 are delivered into the nip of the opposed pairs of rolls of the cooling apparatus 162 for final cooling and hardening of the coatings. The cooling apparatus 162 is similar to the machine described and claimed in my copending patent application Serial No. 788,385, filed January 22, 1959, now abandoned, and in general comprises a plurality of upper rolls such as 150 mounted on a pivoted cover 151, a plurality of opposed, lower rolls such as 152 and drive means 153 for rotating all of the rolls with their blank engaging portions travelling in the direction of advance of the blanks.

The lower rolls 152 are partially immersed in a pan 154 of liquid coolant, the upper rolls are cooled by the liquid coolant showers 155 and suitable refrigeration means is provided for maintaining the coolant reservoir 156 at well below room temperature. The nip pressure of the opposed rolls is just enough to advance the blanks and maintain the straight line direction of the blanks so that in the cooling apparatus 162, the rolls are carrier or conveyor rolls only.

I claim:

1. A method for continuously producing a high gloss, smooth coating on flat box blanks, said method comprising the steps of supporting the upper faces of said blanks in a horizontal plane while advancing said blanks individually and successively along a path, then applying a relatively thin, hot melt wax coating composition to said blanks while said blanks are cool to thereby harden said coating without impregnation into the material of said blanks; then bringing the resulting hardened film coating into contact with a series of reversely rotating smoothing rolls, each at a temperature just above the melting temperature of said composition and reverse roll removing from, and reverse roll dedepositing onto, the upper portion of said film coating, a succession of light thin layers of said film to remove any crow's-foot markings therefrom without melting the lower portion of said film coating; then bringing the resulting film coating, while horizontal, progressively under a series of flame burners, each at a temperature above the melting temperature of said composition, and remelting and liquifying the upper portion of said film coating to flow into a mirror-like, level pool with a high gloss surface to remove any roll coating ridges therefrom without melting the lower portion of said film coating and then bringing the resulting high gloss film coating, while still horizontal, progressively under a continuous, low waterfall of a coolant liquid for quenching said film coating to harden said high gloss surface, without marking said surface.

2. In a wax coater of the type having means for advancing paper box blanks individually and successively along a horizontal path, means along said path for applying a hot melt coating composition to the upper face of said advancing blanks and heated means, further along said path, for smoothing said coatings, the combination of a plurality of gas burners mounted above, and further along said path, each directing flame downwardly onto the upper faces of said advancing blanks for liquifying a thin top layer of said coating into a mirror-like level pool with a high gloss surface; quenching means mounted on said coater still further along said path, said quenching means comprising a shower having a continuous, narrow, emission aperture extending transversely across the path of said blanks at a spaced distance thereabove, for directing an unbroken sheet of liquid in the form of a low waterfall on each said blank advancing thereunder to harden said layer without marking the same and means on said coater for supplying coolant liquid to said shower.

3. In a wax coater the combination of means for advancing a plurality of paper box blanks individually and successively along a horizontal path; roll coating means along said path for applying a thin coating of hot melt wax coating composition, in a thin layer of uniform thickness on the upper, horizontal, face of each advancing blank; heated means further along, and above the horizontal path of said blanks for remelting and liquefying the thin layer of coating on each blank into a mirror-like, level pool with a high gloss surface; quenching means further along and above said horizontal path, said quenching means comprising a shower having a continuous, narrow emission aperture extending transversely entirely across the path of said blanks at a spaced distance above said path for directing an unbroken sheet of quenching liquid in the form of a low waterfall on each said blank advancing thereunder to harden the remelted, liquefied layer thereon without marking the same and means on said coater for supplying coolant liquid to said quenching means.

4. A combination as specified in claim 3 wherein said roll coating means comprises an upper roll having a yieldable resilient face engaging the upper face of said blanks and an opposed roll, having an unyieldable face engaging the lower face of said blanks.

5. A machine for producing a glossy coating on flat paper box blanks, said machine having a feeding zone, a coating zone, a smoothing zone, a levelling zone and a quenching zone and comprising box blank magazine means, in said feeding zone for advancing blanks individually and successively along a horizontal path into said coating zone;

coating apparatus, in said coating zone, including a pair of opposed applicator rolls metering a thin film of hot melt coating composition onto the upper and lower faces of each successive blank for hardening on the fibrous surface thereof without impregnation and including blank carrier means advancing said blanks along a horizontal path through said coating zone into said smoothing zone;

smoothing apparatus in said smoothing zone including at least one reversely rotating, upper, finishing roll rotatively engaging the coated upper face of each successive blank, means for heating the face of said finshing roll above the melting point of said composition for remelting, removing and redepositing a thin layer of said coating on the upper faces of said blanks and a forwardly rotating conveyor roll having a face engaging the coated lower face of said blanks and forming a nip with said reversely rotating finishing roll for advancing said blanks horizontally through said smoothing zone into said levelling zone;

levelling apparatus, in said levelling zone, including endless conveyor means for advancing said blanks along a horizontal path through said levelling zone into said quenching zone and heating means, spaced above the path of said blanks and directing heat, at a temperature above the melting point of said composition, downwardly onto the upper faces of said blanks to remelt a thin upper layer of said coating for flowing into a mirror-like, level high gloss pool and quenching apparatus, in said quenching zone, including conveyor means for advancing said blanks along a horizontal path through said quenching zone and shower means forming a low, unbroken, sheet of cool water falling gently across the entire width of each successive blank advanced thereunder for hardening said high gloss finish without water marking the same.

6. A machine as specified in claim 5 wherein the applicator rolls of said coating apparatus are mounted at a spaced distance along said horizontal path from the finishing roll of said smoothing apparatus for enabling the coatings on said blanks to air dry and harden while advanced therebetween on said blank carrier means.

7. A machine as specified in claim 5 wherein the face of the upper roll of said pair of applicator rolls is of rubber and the face of said finishing roll is also of rubber for yieldably conforming to any irregularities in said blanks.

8. A machine as specified in claim 5 wherein the endless conveyor means of said levelling apparatus includes an elongated stretch in advance of said heating means for air hardening the finished coatings on said blanks and an elongated stretch in rear of said heating means for hardening the levelled coatings on said blanks prior to quenching.

9. A machine as specified in claim 5 wherein one roll of said pair of applicator rolls is unyieldable and the other roll of said pair includes a yieldable, resilient, rubber surface.

10. A machine as specified in claim 5 wherein said shower means include a continuous, transverse emission aperture delivering a sheet of liquid coolant onto a coextensive, horizontal transverse shelf and the transverse terminal edge of said shelf is spaced about one half inch above the upper faces of said blanks advancing horizontally thereunder for forming a low liquid curtain.

11. A machine for producing a gloss coating on flat, paper box blanks said machine comprising means feeding a plurality of said box blanks individually and successively along a path, with the upper faces thereof in a horizontal plane, at a predetermined speed through a coating zone, a smoothing zone, a levelling zone and a quenching zone;

applicator roll means, in said coating zone, applying a metered, relatively thin film of hot melt coating composition to the cool, upper fibrous face of each successive blank for cooling and hardening thereon without impregnation;

smoothing means further along said path in said smoothing zone, said means comprising at least one finishing roll reversely rotating at a predetermined speed in engagement with the upper face of each successive blank;

means for heating the face of said finishing roll to a temperature above the melting point of said coating composition for removing a minutely thin layer of said coating composition from, and redepositing said thin layer on, the lower portion of said thin film to smooth any surface markings on said film without heating said lower portion to the melting point;

levelling means, further along said path, in said levelling zone, said means comprising a heater directing heat downwardly on the upper faces of the blanks advancing horizontally thereunder, at a temperature above the melting point of said coating composition, said heat melting and liquifying said minutely thin layer into a mirror-like pool with a high gloss surface free of nip marks; and quenching means, further along said path, in said quenching zone, said means comprising a laterally continuous curtain of water falling from about one half inch height vertically onto the upper faces of the blanks advancing horizontally thereunder for hardening the mirror-like coating thereon without water marks.

12. Apparatus for producing a high gloss on a plurality of thinly wax coated paper box blanks said apparatus comprising means for supporting said blanks with the upper faces thereof in a horizontal plane while advancing said blanks individually and successively along a path through said apparatus at a predetermined speed;

a plurality of smooth faced, finishing rolls mounted on said apparatus above said path to rotatively engage the coated upper face of each said blank, means for reversely rotating said rolls relative to the direction of advance of said blanks at a predetermined angular speed;

means for maintaining the smooth face of said rolls at just above the melting point of said coating to remove from, and redeposit a minutely thin layer of said coating on the coated upper faces of said blanks for erasing nip marks therein;

a plurality of flame burners, mounted on said apparatus above, and further along said path, said burners directing heat downwardly on said minutely thin layer, at a temperature above the melting point of said coating, and progressively remelting said layer into a pool supported on said thin wax coating to level ridges and scratches therein without impregnation;

and shower means mounted about one half inch above said path, in said quenching zone, said means emitting a laterally continuous, vertical curtain of cool water to fall gently on the levelled upper face of each successive blank for quenching and hardening said coating without water marks.

*13. In a wax coater the combination of means for advancing a plurality of paper box blanks individually and successively along a horizontal path; roll coating means along said path for applying a thin coating of hot melt wax coating composition, in a thin layer of uniform thickness on the upper, horizontal, face of each advancing blank; heated means further along, and above the horizontal path of said blanks for remelting and liquefying the thin layer of coating on each said blank into a mirror like, level pool with a high gloss surface; quenching mean further along and above said horizontal path, said quench ing means comprising a shower extending transversely en tirely across the path of said blanks at a spaced distanc above said path for directing an unbroken sheet of quench ing liquid in the form of a low waterfall on each sai blank advancing thereunder to harden the remelted, lique fied layer thereon without marking the same and mear on said coater for supplying coolant liquid to said quenc ing means.*

*14. In a wax coater the combination of means for a vancing a plurality of paper box blanks individually ar successively along a horizontal path; roll coating mea along said path for applying a thin coating of hot me wax coating composition, in a thin layer of uniform thic ness on the upper, horizontal, face of each advanci blank; heated means further along, and above the ho zontal path of said blanks for remelting and liquefyi the thin layer of coating on each said blank into a mirr like, level pool with a high gloss surface; quenching mea further along and above said horizontal path, said quenc ing means comprising a shower having a continuous me ber extending transversely entirely across the path of s blanks at a spaced distance above said path for directi an unbroken sheet of quenching liquid in the form o low waterfall on each said blank advancing thereunder harden the remelted, liquefied layer thereon without ma ing the same and means on said coater for supplying co ant liquid to said quenching means.*

References Cited by the Examiner

The following references, cited by the Examiner, of record in the patented file of this patent or the origi patent.

UNITED STATES PATENTS

| | | | |
|---|---|---|---|
| 395,645 | 1/89 | Anderson. | |
| 1,429,928 | 9/22 | Carter. | |
| 1,483,967 | 2/24 | Cosgrove | 118—24 |
| 1,618,799 | 2/27 | Blum. | |
| 1,757,620 | 5/30 | Decker et al. | |
| 2,094,348 | 9/37 | Carlson | 117— |
| 2,117,200 | 5/38 | Miller. | |
| 2,159,152 | 5/39 | Hershberger. | |
| 2,163,712 | 6/39 | Shearer | 117— |
| 2,312,927 | 3/43 | Murray. | |
| 2,314,797 | 3/43 | Morris et al. | 117- |
| 2,334,102 | 11/43 | Kauppi et al. | |
| 2,381,942 | 8/45 | Wickwire. | |
| 2,583,220 | 1/52 | Lanigan. | |
| 2,732,319 | 1/56 | Cree. | |
| 2,829,980 | 4/58 | Redd. | |
| 2,882,182 | 4/59 | Tench | 117—119 |
| 2,982,245 | 5/61 | Curler et al. | |
| 3,011,913 | 12/61 | Pierce et al. | |
| 3,055,768 | 9/62 | Lassiter et al. | 117—( |

RICHARD D. NEVIUS, *Primary Examiner.*